(12) United States Patent
Isson et al.

(10) Patent No.: US 8,937,996 B2
(45) Date of Patent: Jan. 20, 2015

(54) RECEIVER WITH ICI NOISE ESTIMATION

(75) Inventors: Olivier Isson, Voreppe (FR); Thomas Morel, Grenoble (FR); Fabrice Belveze, Fontanil-Cornillon (FR)

(73) Assignee: ST-Ericsson SA, Plan-les-Ouates (CH)

( * ) Notice: Subject to any disclaimer, the term of this patent is extended or adjusted under 35 U.S.C. 154(b) by 692 days.

(21) Appl. No.: 13/126,302

(22) PCT Filed: Oct. 29, 2009

(86) PCT No.: PCT/EP2009/064326
§ 371 (c)(1),
(2), (4) Date: Oct. 3, 2011

(87) PCT Pub. No.: WO2010/049509
PCT Pub. Date: May 6, 2010

(65) Prior Publication Data
US 2012/0033721 A1    Feb. 9, 2012

(30) Foreign Application Priority Data
Oct. 31, 2008   (FR) ..................................... 08 57423

(51) Int. Cl.
*H04L 27/10*       (2006.01)
*H04L 25/03*       (2006.01)

(52) U.S. Cl.
CPC .... *H04L 25/03057* (2013.01); *H04L 25/03159* (2013.01); *H04L 2025/03414* (2013.01); *H04L 2025/03522* (2013.01)
USPC ........... 375/233; 375/346; 455/63.1; 455/296

(58) Field of Classification Search
CPC .................. H04L 25/03821; H04L 25/03057; H04L 25/0267; H04L 2025/0349; H04L 2025/036173

USPC .......................... 375/233, 346; 455/63.1, 296
See application file for complete search history.

(56) References Cited

U.S. PATENT DOCUMENTS 6,980,591 B2 * 12/2005 Pukkila et al. ................ 375/229
8,000,417 B1 *  8/2011 Zhidkov et al. ............... 375/346

(Continued)

FOREIGN PATENT DOCUMENTS

CN    1473422 A    2/2004
EP    1940062 A    7/2008

OTHER PUBLICATIONS

Schmidt, K. et al., "Low Complexity Inter-Carrier Interference Compensation for Mobile Reception of EVB-T", International OFDM Workshop, Sep. 1, 2004, pp. 72-76, XP003012043.

(Continued)

*Primary Examiner* — Sophia Vlahos
(74) *Attorney, Agent, or Firm* — Coats & Bennett, P.L.L.C.

(57) ABSTRACT

The invention concerns receive circuitry for demodulating an input signal received from a transmission channel, the receive circuitry having a decision feedback equalizer including an inter-carrier interference estimation block arranged to provide an estimation of inter-carrier interference (ICI) noise based on at least a channel estimation determined for a previous symbol, a channel estimation determined for the next symbol, and on a previous estimation of the symbol data for the current symbol, the previous estimation being provided by a feedback path comprising a demapping block; and correction circuitry arranged to determine the estimation of the original data signal based on the estimation of ICI noise subtracted from the input signal.

15 Claims, 3 Drawing Sheets

(56) References Cited

U.S. PATENT DOCUMENTS

| | | | |
|---|---|---|---|
| 8,295,339 B2* | 10/2012 | Liu | 375/229 |
| 2003/0031244 A1 | 2/2003 | Vaidyanathan | |
| 2005/0099939 A1* | 5/2005 | Huh et al. | 370/210 |
| 2007/0248151 A1 | 10/2007 | Kim et al. | |
| 2008/0008261 A1 | 1/2008 | Baggen | |
| 2008/0101484 A1* | 5/2008 | Wu et al. | 375/260 |

OTHER PUBLICATIONS

Linnartz, Jean-Paul M.G. et al., "Doppler-Resistent OFDM Receivers for Mobile Multimedia Communications", Proceedings of the International Symposium of Mobile Multimedia Systems and Applications, Jan. 1, 2000, pp. 87-92, XP001014332.

* cited by examiner

RECEIVER WITH ICI NOISE ESTIMATION

FIELD OF THE INVENTION

The present invention relates to a receiver for receiving a signal transmitted by multiple carriers, for example modulated according to OFDM (orthogonal frequency-division multiplexing) modulation, and in particular to a receiver arranged to cope with inter-carrier interference (ICI).

BACKGROUND OF THE INVENTION

Inter-carrier interference (ICI) is a common problem in mobile communications systems. When receivers are mobile, interference not only results from multi-path environments leading to multiple echoes received in the time domain, but also from frequency shifts that independently affect these echoes and the original signal. Such frequency shifts are known as Doppler frequency shifts, and are directly proportional to the radio channel frequency and the receiver speed.

The Doppler frequency shift $f_d$ can be estimated as follows:

$$f_d = (v \cdot f_C)/C$$

where v is the speed of the receiver, $f_C$ is the carrier frequency, and C is the speed of the wave, which can be assumed to be $3 \times 10^8$ m/s. Thus assuming a speed v of 140 km/h, and a central carrier frequency in the region of 800 MHz, this leads to a Doppler frequency shift of approximately 100 Hz. In close-packed multiple carrier communications systems this could lead to inter-carrier interference that prevents signals from being successfully received.

OFDM (orthogonal frequency-division multiplexing) modulation is a frequency-division multiplexing scheme according to which packets of data are modulated on a large number of closely packed orthogonal sub-carriers. Each sub-carrier is modulated by a conventional modulation scheme, such as QAM (quadrature amplitude modulation) or PSK (phase shift keying). Data is divided into multiple parallel streams, one for each sub-carrier, and transmitted in symbols comprising all of the modulated sub-carriers.

Digital video broadcasting standards such as DVB-T (digital video broadcasting of terrestrial television) and DVB-H (digital video broadcasting to handheld devices) propose the use of OFDM modulation, and can be applied to wired or wireless signal transmission channels, and to various applications such as digital television and audio broadcasting, wireless networking and broadband internet.

An advantage of OFDM modulation is its ability to cope with severe channel conditions, such as frequency selective fading. However, due to close-packed carriers, there is a problem in adequately dealing with inter-carrier interference in OFDM systems, particularly when a receiver and/or transmitter is moving at relatively high speeds.

SUMMARY OF THE INVENTION

Embodiments of the present invention aim to at least partially overcome one or more problems in the prior art.

According to one aspect of the present invention, there is provided receive circuitry for demodulating an input signal received from a transmission channel, the input signal comprising symbols having N sub-carriers comprising a plurality of data sub-carriers modulated by an original data signal and, in at least certain symbols, a plurality of pilot sub-carriers modulated by reference signals, the receive circuitry comprising a decision feedback equalizer arranged to iteratively process the input signal for a current symbol to generate an estimation of the original data signal modulated by the current symbol, the decision feedback equalizer comprising an inter-carrier interference estimation block arranged to provide an estimation of inter-carrier interference noise based on at least a channel estimation determined for the previous symbol, a channel estimation determined for the next symbol, and on a previous estimation of the symbol data for the current symbol, the previous estimation being provided by a feedback path comprising a demapping block; and correction circuitry arranged to determine the estimation of the original data signal based on the estimation of ICI noise subtracted from the input signal.

According to one embodiment of the present invention, the feedback path further comprises a channel decoder.

According to another embodiment of the present invention, the correction circuitry comprises: the demapping block arranged to perform demapping on an estimation of the symbol data for the current symbol to generate a demapped data signal, said estimation of the original data signal being based on said demapped data signal; and a mapping block arranged to provide said previous estimation of the symbol data for a current symbol based on the demapped data signal.

According to another embodiment of the present invention, the correction circuitry further comprises: the channel decoder arranged to decode the demapped data signal to generate said estimation of the original data signal; and a channel encoder coupled to the output of the channel decoder and arranged to encode said estimation of the original data stream to provide said demapped data signal to said mapping block.

According to another embodiment of the present invention, the inter-carrier interference estimation block is arranged to provide the noise estimation based on the estimation of the original data signal for the current symbol determined by a previous iteration after a first iteration of the decision feedback equalizer for the current symbol.

According to another embodiment of the present invention, the correction circuitry is arranged to determine the estimation of the original data signal based on an estimation of the symbol data for the current symbol determined by dividing the result of the subtraction of the ICI noise estimation from the input signal by a channel estimation for the current symbol.

According to a another embodiment of the present invention, the ICI estimation block is arranged to determine the ICI noise estimation as $C \cdot \hat{S}^{i-1}(n) \cdot \hat{H}_{STAT}(n+1) - \hat{H}_{STAT}(n-1))/2(N+G)$, where C is a reference matrix, $\hat{S}^{i-1}(n)$ is an estimation of the symbol data determined in a previous iteration, $\hat{H}_{STAT}(n+1)$ is the channel estimation for the next symbol, $\hat{H}_{STAT}(n-1)$ is the channel estimation for the previous symbol, N is the number of samples relating to data parts of the input signal, and G is the number of samples relating to guard intervals.

According to yet a further embodiment of the present invention, the ICI estimation block is arranged to determine an N by N matrix $\hat{H}_{VAR}$ equal to $\hat{H}_{STAT}(n+1) - \hat{H}_{STAT}(n-1)$, wherein the diagonal of the $\hat{H}_{VAR}$ matrix consists of zeros, and a maximum width of between 3 and 200 elements, excluding the diagonal, on each row of the matrix are non-zero.

According to a further embodiment of the present invention, the receive circuitry comprises a buffer memory arranged to receive the input signal for symbols to be processed by the decision feedback equalizer and to receive the estimation of the original data signal for symbols process by the decision feedback equalizer.

According to a further embodiment of the present invention, the receive circuitry further comprises a further memory coupled between the buffer memory and the decision feedback equalizer, the further memory arranged to store the input signal for the next symbol to be processed by the decision feedback equalizer.

According to a further embodiment of the present invention, the buffer memory comprises a plurality of memory banks, each of which is adapted to store either the input signal for a symbol to be processed by the decision feedback equalizer or the estimation of the original data signal for a symbol processed by the decision feedback equalizer.

According to a further embodiment of the present invention, the receive circuitry further comprises a control block for controlling whether each of the memory banks is used for storing the input signal or the estimation of the original data signal.

According to a further embodiment of the present invention, the control block is arranged to estimate, for a current symbol being processed by the decision feedback equalizer, the number of errors in the estimation of the original data signal and to control the buffer memory to load the input signal for the next symbol into the decision feedback equaliser based on the detected number of errors.

According to a further embodiment of the present invention, the control block estimates the number of errors by comparing the estimation of the original data symbol prior to channel decoding with the estimation of the original data symbol after channel decoding and re-encoding.

According to a further embodiment of the present invention, the input signal is clocked into the buffer memory structure and the estimation of the original data signal is clocked out of the buffer memory structure based on a first clock signal, and the decision feedback equalizer performs iterations based on a second clock signal having a frequency at least two times as fast as the first clock frequency.

According to a further aspect of the present invention, there is provided mobile device comprising an input for receiving the input signal, a Fourier transform block arranged to convert the input signal into the frequency domain, and the above receive circuitry.

According to yet a further aspect of the present invention, there is provided base station comprising an input for receiving the input signal, a Fourier transform block arranged to convert the input signal into the frequency domain, and the above receive circuitry.

According to yet a further aspect of the present invention, there is provided a method of demodulating an input signal received from a transmission channel, the input signal comprising symbols having N sub-carriers comprising a plurality of data sub-carriers modulated by an original data signal and, in at least certain symbols, a plurality of pilot sub-carriers modulated by reference signals, the method comprising performing an iterative process on the input signal for a current symbol to generate an estimation of the original data signal modulated by the current symbol, the iterative process comprising estimating inter-carrier interference noise based on at least a channel estimation determined for the previous symbol, a channel estimation determined for the next symbol, and on a previous estimation of the symbol data for the current symbol, the previous estimation being provided by a feedback path comprising a demapping block; and determining the estimation of the original data symbol based on the estimation of ICI noise subtracted from the input signal.

According to another embodiment of the present invention, the iterative process further comprises performing demapping on an estimation of the current symbol to generate a demapped data signal, said estimation of the original data stream being based on said demapped data signal; and performing mapping based on the demapped data signal to provide said previous estimation of the current symbol.

According to another embodiment of the present invention, the iterative process further comprises decoding the demapped data signal to generate said estimation of the original data stream; and encoding said estimation of the original data stream to provide said demapped data signal.

BRIEF DESCRIPTION OF THE DRAWINGS

The foregoing and other purposes, features, aspects and advantages of the invention will become apparent from the following detailed description of embodiments, given by way of illustration and not limitation with reference to the accompanying drawings, in which.

DETAILED DESCRIPTION OF THE INVENTION

Figure 1A:
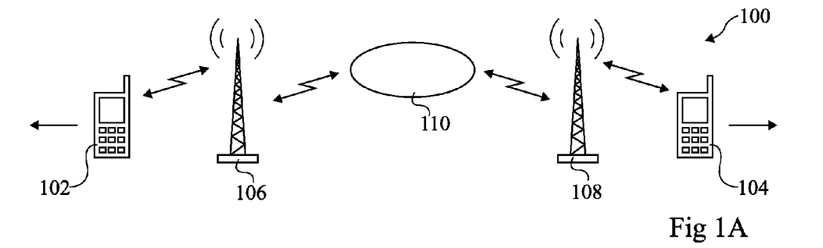
FIGS. 1A and 1B illustrate a communications system comprising mobile communication devices and base stations comprising receive circuitry according to embodiments of the present invention.

FIG. 1A illustrates a communications system 100 comprising a first mobile device 102 and a second mobile device 104 in communication via respective base stations 106, 108 and a mobile communications network 110. As shown, the mobile device 102 and/or mobile device 104 are moving. Each mobile device 102, 104 and base stations 106, 108 comprises receive circuitry for receiving a signal for example modulated based on OFDM modulation.

The mobile devices 102, 104 may be in communication with each other, in which case the digital signal for example comprises a digital audio or video signal. Alternatively, each or both of the mobile devices 102, 104 may receive a broadcast from a remote server via the communications network 110, which could for example be a digital television broadcast. The magnitude of the Doppler frequency shift seen by the receive circuitry in the mobile devices 102, 104 and/or the base stations 106, 108 will depend on the speeds of the devices 102, 104.

Figure 1B:
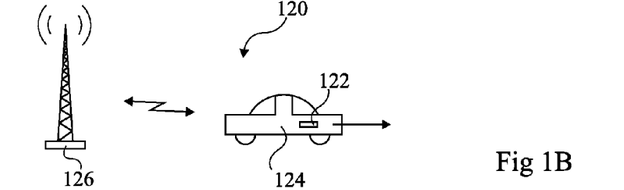

FIG. 1B illustrates part of a communications system 120 in which a communications device 122 is installed in a vehicle 124, which is moving at speed. The communications device 122 is in communication with a base station 126. Again, the communications device 122 and base station 126 comprise receive circuitry for receiving a signal, for example modulated based on OFDM modulation. The digital signal for example comprises a digital audio or video signal, for example digital television from the base station 126 to the communications device 122. The magnitude of the Doppler frequency shift seen by the receive circuitry will depend on the speed of the vehicle 124.

Figure 2A:
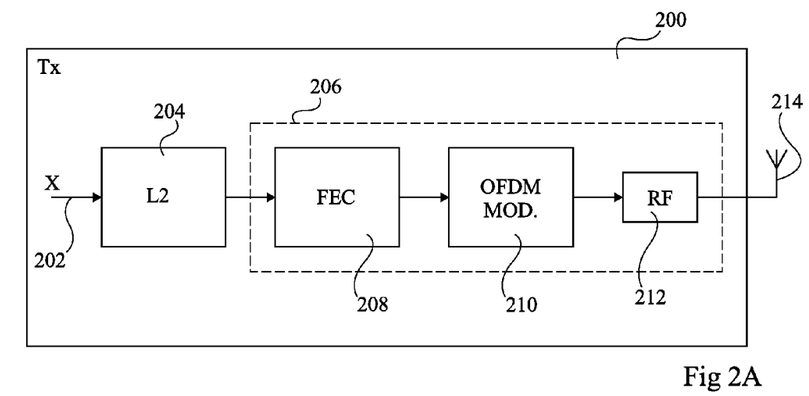
FIGS. 2A and 2B illustrate a transmitter and a receiver respectively according to embodiments of the present invention.

FIG. 2A illustrates an example of transmit Tx circuitry 200, which modulates and transmits a data stream X to, for example, the receive circuitry of mobile devices 102, 104 or base stations 106, 108 of FIG. 1A or the communications device 122 or base station 126 of FIG. 1B. The data stream X is provided on an input line 202. Line 202 is coupled to a block L2 204, which comprises layer 2 circuitry, which for example performs radio link control (RLC) and medium access control (MAC). The output of block 204 is provided to layer 1 circuitry 206, and in particular to an input of a Forward Error Correction (FEC) block 208, which for example performs interleaving, and for example comprises a convolutional DVB-H encoder. The output of FEC 208 is coupled to an OFDM modulation block 210, which performs OFDM modulation. The output of the OFDM modulation block is in turn coupled to an RF block 212, which for example comprises a digital to analogue converter. The RF circuitry 212 for example further comprises frequency up-converters, filters, and a power amplifier. The output of the RF block 212 is coupled to an antenna 214 for transmitting the modulated OFDM signal over a transmission channel.

Figure 2B:
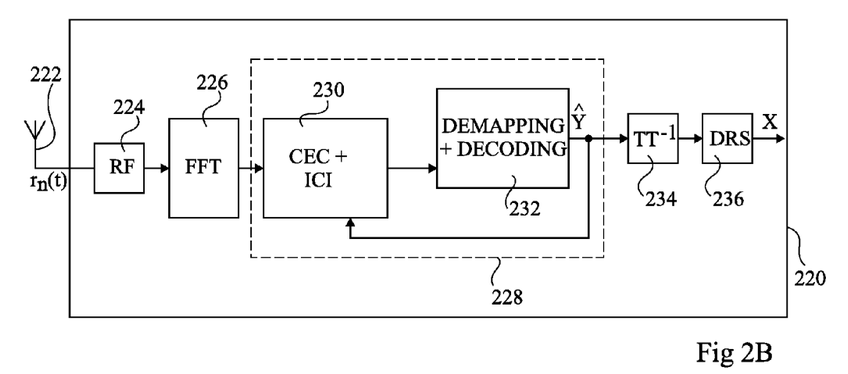

FIG. 2B illustrates an example of receive circuitry 220 arranged to receive the signal transmitted by transmitter 200. Receive circuitry 220 receives a signal $r_n(t)$ from the transmission channel, in this example via an antenna 222, and demodulates the signal to reproduce the original data stream X.

Antenna 222 is coupled to RF circuitry 224, which for example includes a serial to parallel converter. The output of RF circuitry 224 is coupled to a fast Fourier transform block 226, which converts the received signal into the frequency domain. The output of FFT 226 is coupled to a decision feedback equalizer (DFE) 228, comprising a CEC+ICI block 230, which performs channel estimation and correction (CEC) and inter-carrier interference (ICI) removal. DFE 228 also comprises a demapping and decoding block 232, which is coupled to the output of the CEC+ICI block, and which performs demapping and then channel decoding. Channel decoding is for example performed using a Viterbi decoder in the case that the FEC block of the transmitter is a convolutional encoder. Although not shown in FIG. 2B, a de-interleaving operation may be performed between the demapping and channel decoding operations, for example if channel encoding is followed by an interleaver in the transmission circuit. The output of block 232 provides an estimation $\hat{Y}$ of the original data stream X, for example prior to removal of interleaving by a de-interleaving block 234 and decoding of Reed-Solomon (RS) codes by a DRS block 236, although in alternative embodiments these steps may be performed elsewhere or not at all. The output $\hat{Y}$ of the demapping and decoding block 232 is also provided as a feedback signal to the CEC+ICI block 230.

Figure 3A:
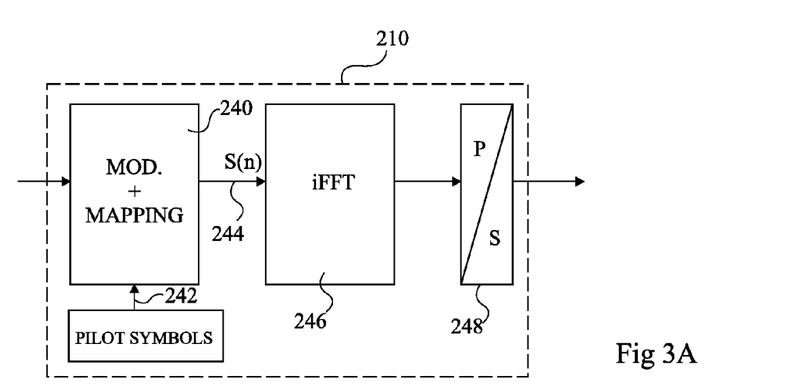
FIG. 3A illustrates an OFDM modulation block of the transmitter of FIG. 2A in more detail according to an embodiment of the present invention.

FIG. 3A illustrates the OFDM modulation block 210 of the transmitter in more detail. As illustrated, to perform the OFDM modulation, block 210 comprises a modulation and mapping block 240, which also receives pilot symbols on input lines 242. This block performs modulation on the sub-carrier frequencies of the data and pilot signals, for example according to PSK (phase shift keying), QPSK (quadrature phase shift keying), or QAM (quadrature amplitude modulation). Although not shown in FIG. 3A, directly after OFDM modulation, a guard interval is for example inserted, and in particular, the end part of a symbol is replicated at its beginning. The resulting parallel data streams S(n) are provided on output lines 244.

Lines 244 are coupled to an inverse fast Fourier transform block (iFFT) 246, which converts the frequency signals into the time domain. The output signals of iFFT 246 are converted into a serial signal, which is generally a complex signal comprising real and imaginary parts communicated on separate wires. Parallel to serial conversion is performed by a parallel to serial converter 248, before being output to the RF circuitry.

Figure 3B:
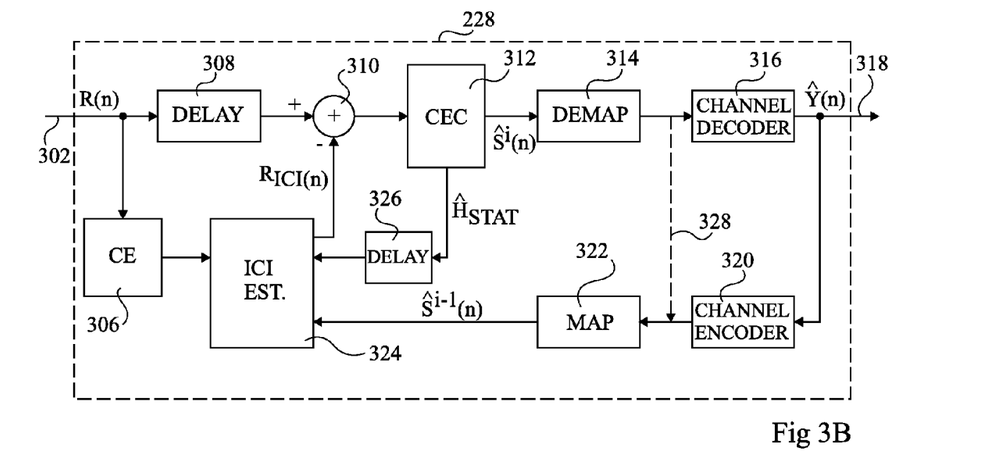
FIG. 3B illustrates a decision feedback equalizer of the receiver of FIG. 2B in more detail according to an embodiment of the present invention.

FIG. 3B illustrates the DFE 228 of FIG. 2B in more detail. The frequency signals R(n) provided by the FFT block 226 are provided to the DFE 228 on lines 302. DFE 228 comprises a channel estimation (CE) block 306 and a delay module 308, each of which receives the frequency signals R(n). Delay module 308 delays signals R(n) by one symbol duration. The outputs of delay module 308 are provided to an adder 310, which subtracts an estimation $R_{ICI}(n)$ of inter-carrier interference noise. The output of adder 310 is provided to a channel estimation and correction block 312, which calculates a channel estimation $\hat{H}_{STAT}$ of the static part of the channel based on the signal $R(n)-R_{ICI}(n)$. The CEC block 312 also provides an estimation $\hat{S}^i(n)$ of symbol data corresponding to the original data stream S(n), where "i" indicates the iteration of the estimation for symbol n, as will be described in more detail below. The original data stream S(n) is the signal provided by the modulation and mapping block 240 of FIG. 3A. The estimation $\hat{S}^i(n)$ is provided to a demapping block 314, which performs demapping, and in particular determines an estimation of the original data based on a known alphabet of the symbol data. The output of demapping block 314 is coupled to a channel decoder 316, which, based on the forward error correction encoding introduced into the data, corrects the estimation based on the estimations of other received data. The output of the channel decoder 316 provides, on an output line 318, the estimation $\hat{Y}(n)$ of the original data signal. Channel decoder 316 is for example a Viterbi decoder.

The output of the channel decoder 316 on line 318 is also provided on a feedback path to a channel encoder 320, which encodes again the data signal, for example according to the Viterbi algorithm, and a mapping block 322, which maps again the data signal to provide the estimate $\hat{S}^{i-1}(n)$ of the data stream generated in the previous iteration to ICI estimation block 324.

As well as the estimation $\hat{S}^{i-1}(n)$, the ICI estimation block 324 receives the estimation $\hat{H}_{STAT}(n+1)$ of the static channel for a next symbol from the channel estimation block 306, and the estimation $\hat{H}_{STAT}(n-1)$ of the static channel for a previous symbol from the channel estimation and correction block 312 after a delay of one symbol duration provided by a delay block 326. Based on these values and a fixed matrix C (described in more detail below), the estimation of the channel inter-carrier interference noise $R_{ICI}(n)$ is determined by the ICI estimation block 324 and provided to the added 310 to be subtracted from the input signal R(n).

As illustrated by dashed line 328 in FIG. 3B, rather than the feedback path to the ICI estimation block 324 being provided via Viterbi encoder 320, the feedback path could be provided directly from the output of demapping block 314 to the input of mapping block 322 via line 328.

Generation of the estimation S(n) of the original symbol data by the blocks in FIG. 3B will now be described.

It will be assumed that, in the frequency domain, the signal R(n) received by the receiver is equal to:

$$R(n)=H \cdot S+W$$

where H represents the channel matrix, and consists of two components $H_{STAT}+H_{VAR}$, where $H_{STAT}$ is a matrix comprising the diagonal of the channel matrix H, this diagonal corresponding to static propagation in the channel, and $H_{VAR}$ is a matrix comprising the elements of the matrix H except the diagonal, these elements corresponding to dynamic propagation in the channel. S is the original signal and W represents noise in the channel. It follows that:

$$R(n)=H_{STAT}\cdot S(n)+H_{VAR}\cdot S(n)+W$$

An estimation of the transmitted signal $\hat{S}(n)$ is determined as follows:

$$\hat{S}(n)=(R(n)-R_{ICI}(n))/\hat{H}_{STAT}$$

where $R_{ICI}(n)$ is the inter-carrier interference noise determined as $H_{VAR}(n)\cdot\hat{S}^{i-1}(n)$. In FIG. 3B, the ICI estimation block 324 determines $R_{ICI}(n)$, which is subtracted from R(n) by adder 310, and this result is divided by $\hat{H}_{STAT}$ in the CEC block 312 to generate the estimation of the transmitted signal $\hat{S}$.

The generation of $R_{ICI}(n)$ by ICI estimation block 324 will now be described with reference to FIG. 4.

Figure 4:
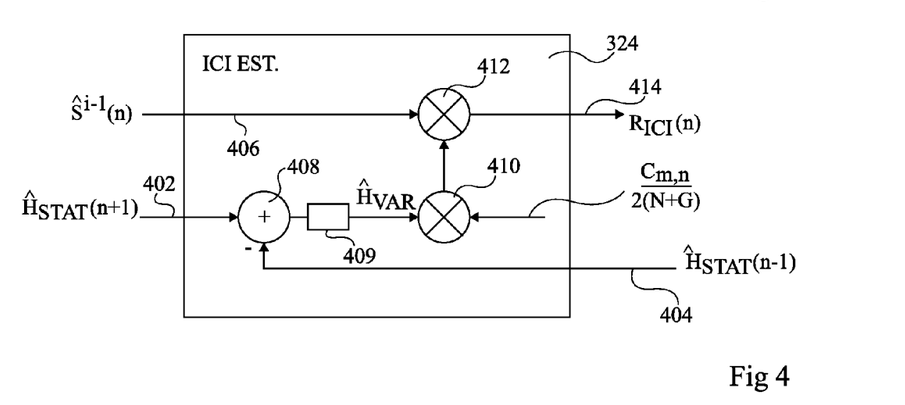
FIG. 4 illustrates an inter-carrier interference estimation block of FIG. 3B in more detail according to an embodiment of the present invention.

FIG. 4 illustrates the ICI estimation block 324 of FIG. 3B in more detail. Block 324 comprises an input 402 for receiving, from the channel estimation block 306, a channel estimation $\hat{H}_{STAT}(n+1)$ for a next symbol, an input 404 for receiving, from delay block 326, a channel estimation $\hat{H}_{STAT}(n-1)$ for a previous symbol, and on an input line 406, the estimation of the original signal $\hat{S}^{i-1}(n)$ from the mapping block 322, if a previous iteration of the DFE 228 for the current symbol n has already been performed.

An adder 408 performs the subtraction of the next and previous channel estimations received on lines 402 and 404, and provides the resulting vector to a block 409, which expands the vector into the matrix $\hat{H}_{VAR}$, having the vector values positioned along its diagonal. $\hat{H}_{VAR}$ is provided to a multiplier 410, which multiplies this by a reference matrix $C_{m,n}$ divided by 2(N+G), where N is the number of samples in each symbol representing information, and G is the number of samples in each symbol representing guard intervals, and thus N+G is the total length in samples of one OFDM symbol. The matrix $C_{m,n}$ will be described in more detail below. The output of multiplier 410 is provided to a further multiplier 412, which multiplies the result of the multiplication performed by multiplier 410 with the estimation $\hat{S}^{i-1}(n)$, which is a vector. The output vector of multiplexer 412 is the signal $R_{ICI}(n)$, which is provided on an output line 414.

As an alternative, the computation can be performed in a mathematically equivalent form by first multiplying $\hat{S}^{i-1}(n)$ by $C_{m,n}/2(N+G)$, and independently multiplying each component of the resulting vector by the corresponding component of the vector $\hat{H}_{STAT}(n+1)-\hat{H}_{STAT}(n-1)$.

Thus, the $\hat{H}_{VAR}$ matrix is approximated using a piece-wise linear approximation. In particular, an estimation of $\hat{H}_{VAR}$ is determined as:

$$\hat{H}_{VAR}=C_{m,n}\cdot(\hat{H}_{STAT}(n+1)-\hat{H}_{STAT}(n-1))/2(N+G)$$

The reference matrix $C_{m,n}/2(N+G)$ is for example stored in memory in the receiver. C is a matrix defined as $C_{n,m}=B_{n-m}/N$, where $B_{n-m}$ can be defined as:

$$B_k = T_s \cdot N \cdot \begin{cases} -\dfrac{1}{1-e^{\frac{-j2\pi k}{N}}}, & k \neq 0 \\ 0.5, & k = 0 \end{cases}$$

where $T_S$ is the sampling period.

Figure 5:
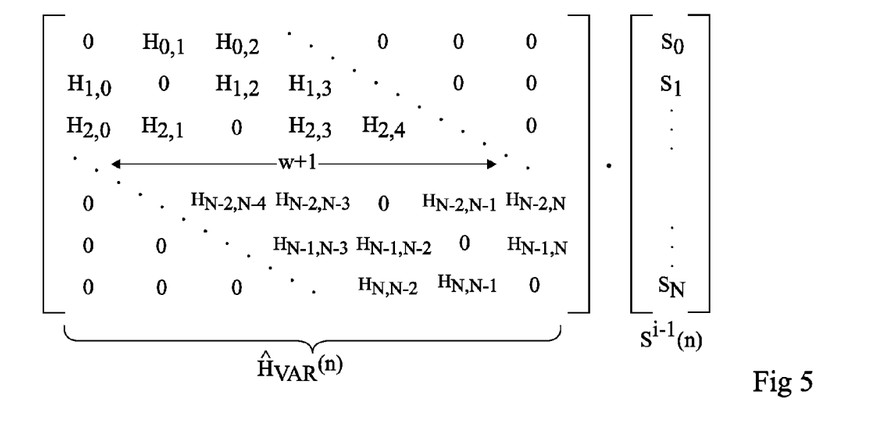
FIG. 5 shows $\hat{H}_{VAR}(n)$ and $\hat{S}^{i-1}(n)$ matrices as determined according to embodiments of the present invention.

The matrix $\hat{H}_{VAR}$ and vector $\hat{S}^{i-1}(n)$ are shown in FIG. 5. As illustrated, the matrix $\hat{H}_{VAR}$ has a zero diagonal and other elements H for a number of values on either side of the diagonal. The present inventors have found that good performance can be achieved without using all of the elements of the $\hat{H}_{VAR}$ matrix. This matrix is an N by N matrix, where N is the number of sub-carrier frequencies. Given that N can equal several thousand, it is likely to be demanding on processor resources to deal with the full number of elements of the matrix. Thus a maximum number of w non-zero values are present in each row, the remaining values being zero. w is for example equal to at least 2, and a value of 60 has been found to work particularly well in the DVB-T or DVB-H systems, particularly wherein N=8192.

The estimation of the static part of channel $\hat{H}_{STAT}$ for the next and previous symbols as determined by the channel estimation block 306 and channel estimation and correction block 312 of FIG. 3B can be performed based on the pilot sub-carrier signals. Pilot sub-carriers are for example present every three carrier frequencies. In particular, interpolation is performed by, for example, first performing a linear interpolation to provide an estimation of the channel based on the pilot carrier frequencies. Second, a frequency interpolation, for example using one or more FIR filters, is performed to complete the whole channel estimation $\hat{H}_{STAT}$. It should be noted that $\hat{H}_{STAT}$ for the previous symbol is calculated by CEC 312 based on the signal with ICI noise RICI removed, while $\hat{H}_{STAT}$ for the next symbol is generated without ICI noise being removed.

Referring again to FIG. 3B, the DFE 228 operates at a higher rate than the rate that symbols are received. This means that more than one iteration of the loop can be performed for each symbol.

Generally, at least two iterations are performed by DFE 228 for each symbol. On the first iteration there is not yet an estimation $\hat{S}^{i-1}(n)$ of the data signal for symbol n. According to some embodiments of the DFE 228, the iteration loop is clocked at a rate three times higher than that of the incoming symbols, meaning that three iterations are performed for each symbol. However, the inventors have found that the number of iterations that can provide the original data with very few or no errors may be as many as six iterations. To allow flexibility in the number of iterations performed for each symbol, an adaptable buffer memory is preferably used, as will now be described.

Figure 6:
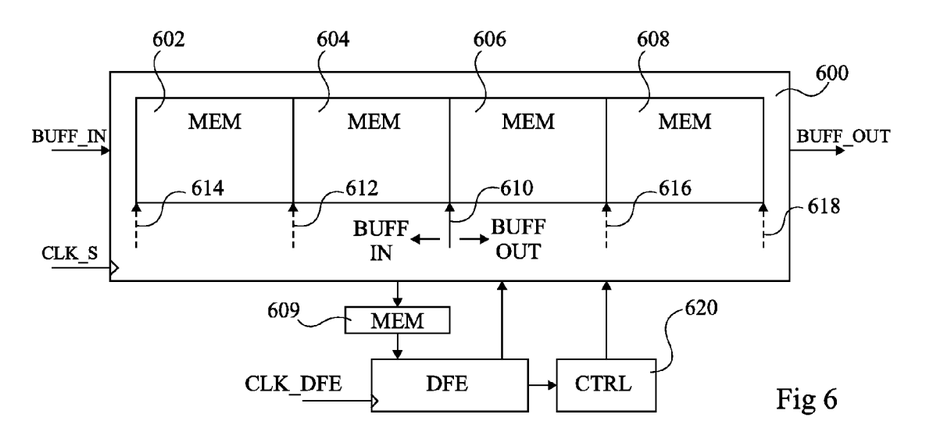
FIG. 6 illustrates a buffer memory according to an embodiment of the present invention.

FIG. 6 illustrates a buffer memory 600 coupled to the DFE 228. Memory 600 comprises, in this example, four memory banks 602 to 608, which are used as input and/or output buffers for storing the R(n) data received on a buffer input BUFF_IN prior to processing by the DFE 228, and for storing estimates Y from the DFE 228 before they are output on a buffer output BUFF_OUT. In other words, the buffer memory is coupled to the input and output of the DFE 228. A memory 609 is provided between the memory 600 and the DFE 228 to temporarily store the R(n) data relating to the next symbol to be processed.

An input/output clock signal CLK_S of the memory structure controls when data corresponding to a symbol is clocked into an input buffer on the BUFF_IN input lines and clocked out of an output buffer on the BUFF_OUT output lines. The frequency of clock signal CLK_S is the same as the frequency that symbols arrive. On the other hand, DFE 228 is clocked by a clock signal CLK_DFE, which in this example has a frequency three times higher than CLK_S. In alternative embodiments the frequency of clock signal CLK_DFE could be at a different frequency, for example between 2 and 10 times the frequency of clock signal CLK_S.

A pointer 610 is shown in FIG. 6 between memory banks 604 and 606 indicating the boundary between the input and output buffers. This pointer may be moved to positions 612, 614, 616 or 618 depending on the number of input/output buffers that are required, as will now be explained.

Control circuitry CTRL 620 receives the output of DFE 228, and determines whether the remaining number of errors in the demodulated data signal $\hat{Y}(n)$ warrants a further iteration of the DFE 228 for a particular symbol, or whether the data is ready to be output from the DFE to the buffer 600. In particular, error correction codes in the data signal allow the number of errors present in the data before decoding to be estimated. The encoder compares the received coded data, for example at the output of DEMAP block 314, with data obtained after decoding and subsequent encoding, in other words at the output of the channel encoder 320. Control block 620 generates a control signal for controlling the buffer block 600 accordingly. In particular, the control signal either indicates that the output of the DFE is to be stored in the output buffer 600 and the data for a next symbol loaded into the DFE, or indicates that the pointer should change position.

In normal operation, the two left hand memory banks 602 and 604 are designated as input buffers, and the two right hand memory banks 606, 608 are designated as output buffers.

Preferably a maximum number M of iterations for a given symbol is specified in the system. M is for example set to at least two, and is for example between 2 and 10. The present inventors have found that, in DVB-T and DVB-H applications, after six iterations of the DFE 228, all errors are usually corrected, and therefore the maximum number M of iterations is for example specified as six in such applications.

Initially it is assumed that pointer 610 is at the position between memory banks 604 and 606. If the control block 620 indicates after only two iterations of the DFE 228 for a current symbol that the data is ready to be output, banks 606 and 608 have not yet been emptied, and thus the pointer is moved to position 612 to create a new output buffer. At the same time, the contents of memory bank 604 is loaded into memory 609 ready to be processed, and the output of DFE 228 is loaded into the memory bank 604. The processing of the data for the next symbol in memory 609 is then started. If this subsequent symbol also uses less than three iterations, then again the pointer can be moved to position 614, turning bank 602 into a further output buffer. While the pointer is in position 614, any symbols requiring less than three iterations will be iterated three times, as the output buffer can no longer be expanded.

On the other hand, when the pointer is in position 614, if the control block 620 determines that the error rate should be improved by applying more than three iterations to the data for a current symbol being processed, more input buffers can be created. In particular, after the third iteration, the control block turns bank 602 into an input buffer by moving the pointer to position 612. If needed, during processing of the data for subsequent symbols, the pointer can be moved to each of the positions 610, 616 and 618 successively to provide more input buffers. However, once the pointer reaches position 618, no more input buffers can be created, and therefore, even if the error rate could be reduced by further iterations, symbols are iterated a maximum of three times until output buffers become liberated again.

Figure 7:
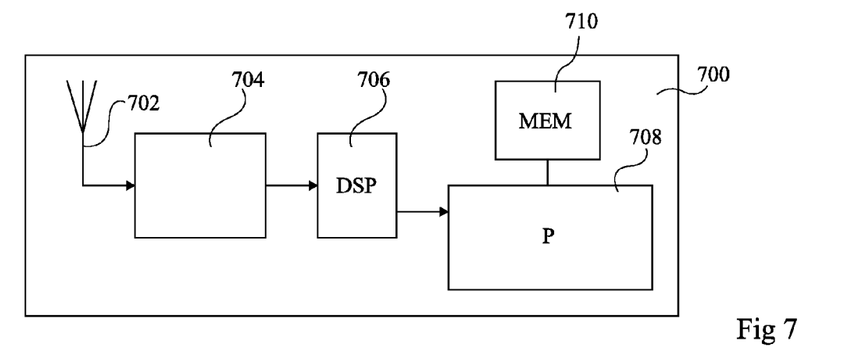
FIG. 7 illustrates an electronic device according to a further embodiment of the present invention.

FIG. 7 illustrates an electronic device 700 comprising an antenna 702 than receives a modulated signal on multiple carrier frequencies. Antenna 702 is coupled to receive circuitry 704. The output of the receive circuitry 704 is coupled to a digital signal processor (DSP) block 706, which is further coupled to the main processor 708 of the device. The receive circuitry of FIG. 3A described above, and in particular the DFE 228, is for example implements in the receive circuitry 704 in hardware, or may alternatively be implemented by software executed by the DSP 706, or by a combination of hardware and software. Processor 708 is coupled to a memory 710, which for example stores data received via the antenna 702. Although not shown in FIG. 7, processor 708 is for example coupled to one or more other components such as display units, input/output devices, etc.

Device 700 is for example any electronic device that includes circuitry for demodulating a modulated signal, for example an OFDM signal, such as mobile devices including telephones, laptop computers, PDA'a (personal digital assistants), portable games consoles, etc. Device 700 could also be a device such as a PC or a set-top box. Device 700 is for example arranged to receive signals such as video or television, for example according to the DVB-T or DVB-H standards. Device 700 could also be a device provided in a base station for receiving and demodulating a modulated signal, for example received from a mobile device.

An advantage of the receive circuitry described herein is that, by providing the feedback path via the demapping block 314 and mapping block 322, a decision for the symbol data is taken based on knowledge of an alphabet to which the symbol data belongs. This improves the accuracy of the feedback path. Furthermore, if demapping were not performed in the feedback path, thermal noise would be re-injected into the system, leading to more errors. In some embodiments the feedback path also includes the channel decoder 316 and channel encoder 320, and this provides the additional advantage of correcting at least some errors in the decisions on the symbol data taken during demapping.

A further advantage of the receive circuitry described herein is that the DFE 228 provides a simple and effective way of removing inter-carrier interference from a multiple carrier signal. In particular, it has been found by the present inventors that while in previous known OFDM receivers, Doppler frequency shifts greater than 80 Hz generally lead to inter-carrier interference that prevents correct data transmission, the receiver described herein can cope with Doppler frequency shifts as high as 180 Hz. Assuming a central carrier frequency of 800 MHz, this means that the maximum speed of the receive circuitry can be increased from 108 km/h to 243 km/h, in other words a speed increase of 135 km/h.

A further advantage of the receive circuitry described herein is that more or less iterations may be performed depending on the quality of the received signal. Advantageously, an adaptable buffer is provided to compensate for variations in the processing delay for each symbol.

While a number of particular embodiments of the present invention have been described, it will be apparent to those skilled in the art that various modifications and alternatives may be applied.

For example, while embodiments have been described in which the particular demodulating steps are involved, such as viterbi decoding, it will be apparent to those skilled in the art that addition and/or alternative steps may be applied.

Furthermore, while a memory buffer structure has been described in relation to FIG. 6 as comprising four memory banks, in alternative embodiments, a greater or smaller number of memory banks could be provided.

The invention claimed is:

1. Receive circuitry operative to demodulate an input signal received from a transmission channel, the input signal comprising symbols having a plurality of sub-carriers comprising a plurality of data sub-carriers modulated by an original data signal and, in at least certain symbols, a plurality of pilot sub-carriers modulated by reference signals, the receive circuitry comprising:
  a decision feedback equalizer arranged to iteratively process said input signal for a current symbol to generate an estimate of the original data signal modulated by the current symbol, the decision feedback equalizer comprising
    an inter-carrier interference (ICI) estimation block arranged to provide an estimate of ICI noise based on at least a channel estimate determined for a previous symbol, a channel estimate determined for a next symbol, and on a previous estimate of symbol data for the current symbol, the previous estimate being provided by a feedback path comprising a demapping block, wherein the demapping block determines an estimation of the original data signal based on a known alphabet of the symbol data; and
    correction circuitry arranged to determine the estimate of the original data signal based on said estimate of ICI noise subtracted from said input signal.

2. The receive circuitry of claim 1 wherein said feedback path further comprises a channel decoder.

3. The receive circuitry of claim 1 wherein the correction circuitry comprises:
  the demapping block arranged to perform demapping on an estimate of the symbol data for the current symbol to generate a demapped data signal, said estimate of the original data signal being based on said demapped data signal; and
  a mapping block arranged to provide said previous estimate of the symbol data for a current symbol based on the demapped data signal.

4. The receive circuitry of claim 3, further comprising:
  a channel decoder arranged to decode the demapped data signal to generate said estimate of the original data signal; and
  a channel encoder coupled to the output of the channel decoder and arranged to encode said estimate of the original data stream to provide said demapped data signal to said mapping block.

5. The receive circuitry of claim 1 wherein said correction circuitry is arranged to determine the estimate of the original data based on an estimate of the symbol data for the current symbol determined by dividing the result of the subtraction of the ICI noise estimate from the input signal by a channel estimate for the current symbol.

6. The receive circuitry of claim 1 wherein said ICI estimation block is arranged to determine the ICI noise estimate as:

$$R_{ICI}(n) = C \cdot \hat{S}^{i-1}(n) \cdot (\hat{H}_{STAT}(n+1) - \hat{H}_{STAT}(n-1))/2(N+G)$$

where C is a reference matrix, · denotes multiplication,
$\hat{S}^{i-1}(n)$ is an estimate of the symbol data for the current symbol determined for a previous iteration of the decision feedback equalizer for symbol n,
$\hat{H}_{STAT}(n+1)$ is the channel estimate for the next symbol,
$\hat{H}_{STAT}(n-1)$ is the channel estimate for the previous symbol,
N is the number of samples relating to data parts of the input signal, and
G is the number of samples relating to guard intervals.

7. The receive circuitry of claim 6 wherein matrix C is defined as $C_{n,m} = B_{n-m}/N$, where $B_{n-m}$ is defined as:

$$B_k = T_s \cdot N \cdot \begin{cases} -\dfrac{1}{1 - e^{\frac{-j2\pi k}{N}}}, & k \neq 0 \\ 0.5, & k = 0 \end{cases}$$

where n and m are two integers, and $T_S$ is the sampling period.

8. The receive circuitry of claim 6 wherein said ICI estimation block is arranged to determine an N by N matrix $\hat{H}_{VAR}$ equal to $\hat{H}_{STAT}(n+1) - \hat{H}_{STAT}(n-1)$, wherein the diagonal of the $\hat{H}_{VAR}$ matrix consists of zeros, and a maximum width of between 3 and 200 elements excluding the diagonal on each row of said matrix are non-zero.

9. The receive circuitry of claim 1, further comprising:
  a buffer memory arranged to receive said input signal for symbols to be processed by the decision feedback equalizer and to receive said estimate of the original data signal for symbols process by the decision feedback equalizer;
  wherein said buffer memory comprises a plurality of memory banks, the storage in each memory bank of said input signal for a symbol to be processed by the decision feedback equalizer or of said estimate of the original data signal for a symbol processed by the decision feedback equalizer being determined by a control block.

10. The receive circuitry of claim 9 wherein said control block is arranged
  to estimate, for a current symbol being processed by the decision feedback equalizer, the number of errors in said estimate of said original data signal; and
  to control said buffer memory to load the input signal for the next symbol into said decision feedback equalizer based on the detected number of errors.

11. The receive circuitry of claim 10 wherein said control block is arranged to estimate said number of errors by comparing the estimate of the original data symbol prior to channel decoding with the estimate of the original data symbol after channel decoding and re-encoding.

12. The receive circuitry of claim 9 wherein said input signal is clocked into said buffer memory structure and said estimate of the original data signal is clocked out of said buffer memory structure based on a first clock signal, and said decision feedback equalizer performs iterations based on a second clock signal having a frequency at least two times that of said first clock frequency.

13. The receive circuitry of claim 1 operative in a mobile device and further comprising:
  an input for receiving said input signal; and
  a Fourier transform block arranged to convert said input signal into the frequency domain.

14. The receive circuitry of claim 1 operative in a base station and further comprising:
  an input for receiving said input signal; and
  a Fourier transform block arranged to convert said input signal into the frequency domain.

15. A method of demodulating an input signal received from a transmission channel, the input signal comprising symbols having a plurality of sub-carriers comprising a plurality of data sub-carriers modulated by an original data signal and, in at least certain symbols, a plurality of pilot sub-carriers modulated by reference signals, the method comprising:
  performing an iterative process on said input signal for a current symbol to generate an estimate of the original data signal modulated by the current symbol, the iterative process comprising estimating inter-carrier interference (ICI) noise based on at least a channel estimate determined for a previous symbol, a channel estimate determined for the next symbol, and on a previous estimate of symbol data for the current symbol, the previous estimate being provided by a feedback path comprising a demapping block, wherein the demapping block determines an estimation of the original data signal based on a known alphabet of the symbol data; and determining the estimate of the original data signal based on said estimate of ICI noise subtracted from said input signal.

\* \* \* \* \*

UNITED STATES PATENT AND TRADEMARK OFFICE
CERTIFICATE OF CORRECTION

PATENT NO. : 8,937,996 B2  
APPLICATION NO. : 13/126302  
DATED : January 20, 2015  
INVENTOR(S) : Isson et al.

Page 1 of 1

It is certified that error appears in the above-identified patent and that said Letters Patent is hereby corrected as shown below:

In the Specification

In Column 2, Line 46, delete "C-$\hat{S}^{i-1}$ (n)·$\hat{H}_{STAT}$(n+1)" and insert -- C·$\hat{S}^{i-1}$ (n) · ($\hat{H}_{STAT}$ (n+1) --, therefor.

In Column 7, Line 52, delete "$\hat{H}_{STAT}$(n+1)–$\hat{H}H_{STAT}$(n–1)." and insert -- $\hat{H}_{STAT}$ (n+1)–$\hat{H}_{STAT}$ (n–1). --, therefor.

Signed and Sealed this  
Third Day of December, 2019

Andrei Iancu  
*Director of the United States Patent and Trademark Office*